T 859,012

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 43

769,435

CELLULOSE ESTER CURTAIN COATING THERMOPLASTIC MATERIAL AND PROCESS FOR EMPLOYING THE SAME

Donald E. Gonzalez and David A. Tenquist, both of P.O. Box 511, Kingsport, Tenn. 37662

Continuation of application Ser. No. 633,702, Apr. 26, 1967. This application Oct. 21 1968. Published Feb. 4, 1969

Class 106—180

No Drawing. 12 Pages Specification

Curtain coating composition for coating substrates such as paper or packing an article on a substrate coated with the composition applied to the article and substrate as a falling molten curtain. The composition contains 50–90 percent by weight of cellulose acetate propionate, cellulose acetate butyrate or cellulose propionate butyrate together with 10–50 percent by weight of a plasticizer having a boiling point of at least 325° C. As a hot melt at 375° C. the composition has a viscosity of 20,000 to 175,000 cps. and a melt stability of at least 1.5 hours.